US 9,483,664 B2

(12) United States Patent
Chandra et al.

(10) Patent No.: US 9,483,664 B2
(45) Date of Patent: Nov. 1, 2016

(54) ADDRESS DEPENDENT DATA ENCRYPTION

(71) Applicant: ARM LIMITED, Cambridge (GB)

(72) Inventors: Vikas Chandra, San Jose, CA (US); Robert Campbell Aitken, San Jose, CA (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/486,181

(22) Filed: Sep. 15, 2014

(65) Prior Publication Data

US 2016/0078252 A1   Mar. 17, 2016

(51) Int. Cl.
G06F 11/30 (2006.01)
G06F 21/79 (2013.01)
G06F 12/14 (2006.01)
H04L 9/08 (2006.01)
G06F 21/72 (2013.01)
G09C 1/00 (2006.01)

(52) U.S. Cl.
CPC ........... *G06F 21/79* (2013.01); *G06F 12/1408* (2013.01); *G06F 21/72* (2013.01); *G09C 1/00* (2013.01); *H04L 9/0861* (2013.01); *H04L 9/0866* (2013.01); *G06F 2212/402* (2013.01); *H04L 2209/12* (2013.01)

(58) Field of Classification Search
CPC .......................... G06F 21/72; G06F 2212/402
USPC ....................................................... 713/190
See application file for complete search history.

(56) References Cited

U.S. PATENT DOCUMENTS

| 8,645,735 B1 | 2/2014 | Ardis et al. |
| 2003/0112972 A1* | 6/2003 | Hattick ................. H04L 9/0656 380/46 |
| 2010/0115286 A1* | 5/2010 | Hawkes .............. G06F 12/1408 713/189 |
| 2010/0146303 A1 | 6/2010 | Kothari et al. |
| 2012/0246489 A1* | 9/2012 | Brelot ................. G06F 21/6209 713/193 |

FOREIGN PATENT DOCUMENTS

WO   WO 2009/024913   2/2009

OTHER PUBLICATIONS

M. Arora, "Secure Your Security Key in On-Chip SRAM: Techniques to Avoid Data Remanance Attacks", http://www.design-reuse.com/articles/17660/on-chip-sram-data-remanance-attacks.html, retrieved Sep. 9, 2014, 5 pages.

(Continued)

*Primary Examiner* — Teshome Hailu
(74) *Attorney, Agent, or Firm* — Nixon & Vanderhye P.C.

(57) ABSTRACT

Encryption of data within a memory 6 is provided by key generation circuitry 12 which serves to generate a key as a function of the address within the memory 6 being accessed and then encryption circuitry 14 or decryption circuitry 16 which serve respectively to encrypt or decrypt the data as a function of the key that has been generated based upon the address. The encryption and the decryption may be performed using a bitwise XOR operation. The key generation circuitry may have the form of physically unclonable function circuitry, which varies from instance to instance of implementation and that operates to generate the same key for the same address upon both write and read operations within the same instance.

15 Claims, 6 Drawing Sheets

(56) References Cited

OTHER PUBLICATIONS

Figure 1:
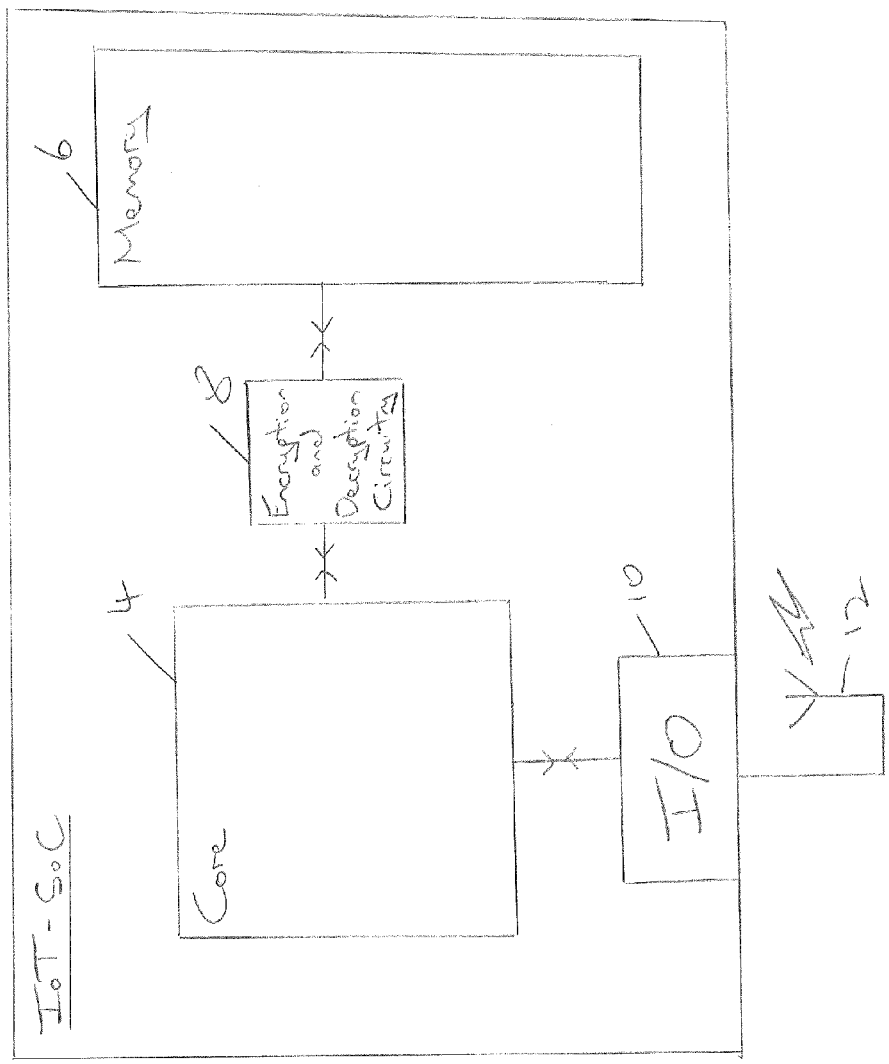

S. Skorobogatov, "Low Temperature Data Remanence in Static RAM", University of Cambridge Computer Library, Technical Report, No. 536, Jun. 2002, 9 pages.

Y. Kai et al., "Security Strategy of Powered-off SRAM for Resisting Physical attack to Data Remanence", Journal of Semiconductors, vol. 30, No. 9, Sep. 2009, 5 pages.

K. Wenjing et al., "Novel Security Strategies for SRAM in Powered-off State to Resist Physical Attack", Huazhong University of Science and Technology, Department of Electric Science and Technology, ISIS 2009, 4 pages.

G. Suh et al., Physical Unclonable Functions for Device Authentication and Secret Key Generation, DAC 2007, Jun. 4-8, 2007, 6 pages.

CS387-Unit 1: Symmetric Cryptography and Applications, https://www.udacity.com/wiki/cs387/unit-1#one-time-pad , 8 pages.

P. Gutmann, "Data Remanence in Semiconductor Devices", IBM T.J. Watson Research Center, 19 pages.

L. Benini et al., "Energy-Efficient Data Scrambling on Memory-Processor Interfaces", *ISLPED'03*, Aug. 25-27, 2003, 4 pages.

International Search Report and Written Opinion of the International Searching Authority issued Oct. 29, 2015 in PCT/GB2015/052388, 11 pages.

\* cited by examiner

ADDRESS DEPENDENT DATA ENCRYPTION

BACKGROUND

This disclosure relates to the field of data processing systems. More particularly, this disclosure relates to the encryption of data within data processing systems.

It is known to protect sensitive data, such as encryption key data, financial data and the like, using encryption mechanisms within data processing systems. An assumption often made within data processing systems in relation to the protection of data is that when that data is erased from a memory, then it will not be recoverable. For example, when power to a volatile memory is removed, the data within that memory is assumed to be erased. However, in practice there may be physical characteristics of the memory that allow erased data to be reconstructed. Data remnance poses a threat to systems that make this assumption, i.e. that data erased from a memory will not be recoverable.

Another potential problem with data encryption mechanisms is that these may consume a disadvantageous amount of energy when encrypting and decrypting data. For example, complex algorithms, such as RSA, can consume many hundreds of thousands of processing cycles to perform their encryption and decryption operations. Within systems with energy budget constraints, such as battery-operated internet-of things devices, the energy consumed by such encryption and decryption mechanisms is a disadvantage.

SUMMARY

Viewed from one aspect the present disclosure provides apparatus comprising:
memory to store encrypted data representing unencrypted data at a storage location specified by an address;
key generation circuitry to generate a key as a function of said address;
encryption circuitry to encrypt said unencrypted data to form said encrypted data as a function of said key.
Viewed from another aspect the present disclosure provides apparatus comprising:
memory means for storing encrypted data representing unencrypted data at a storage location specified by an address;
key generation means for generating a key as a function of said address;
encryption means for encrypting said unencrypted data to form said encrypted data as a function of said key.
Viewed from another aspect the present disclosure provides a method comprising the steps of:
storing encrypted data representing unencrypted data at a storage location specified by an address;
generating a key as a function of said address;
encrypting said unencrypted data to form said encrypted data as a function of said key.
Viewed from another aspect the present disclosure provides apparatus comprising:
memory to store encrypted data representing unencrypted data at a storage location specified by an address;
key generation circuitry to generate a key as a function of said address;
decryption circuitry to decrypt said encrypted data to form said unencrypted data as a function of said key.
Viewed from another aspect the present disclosure provides apparatus comprising:
memory means for storing encrypted data representing unencrypted data at a storage location specified by an address;
key generation means for generating a key as a function of said address;
decryption means for decrypting said encrypted data to form said unencrypted data as a function of said key.
Viewed from another aspect the present disclosure provides a method comprising the steps of:
storing encrypted data representing unencrypted data at a storage location specified by an address;
generating a key as a function of said address;
decrypting said encrypted data to form said unencrypted data as a function of said key.
Example embodiments will now be described, by way of example only, with reference to the accompanying drawings in which:

DRAWINGS

Figure 2:
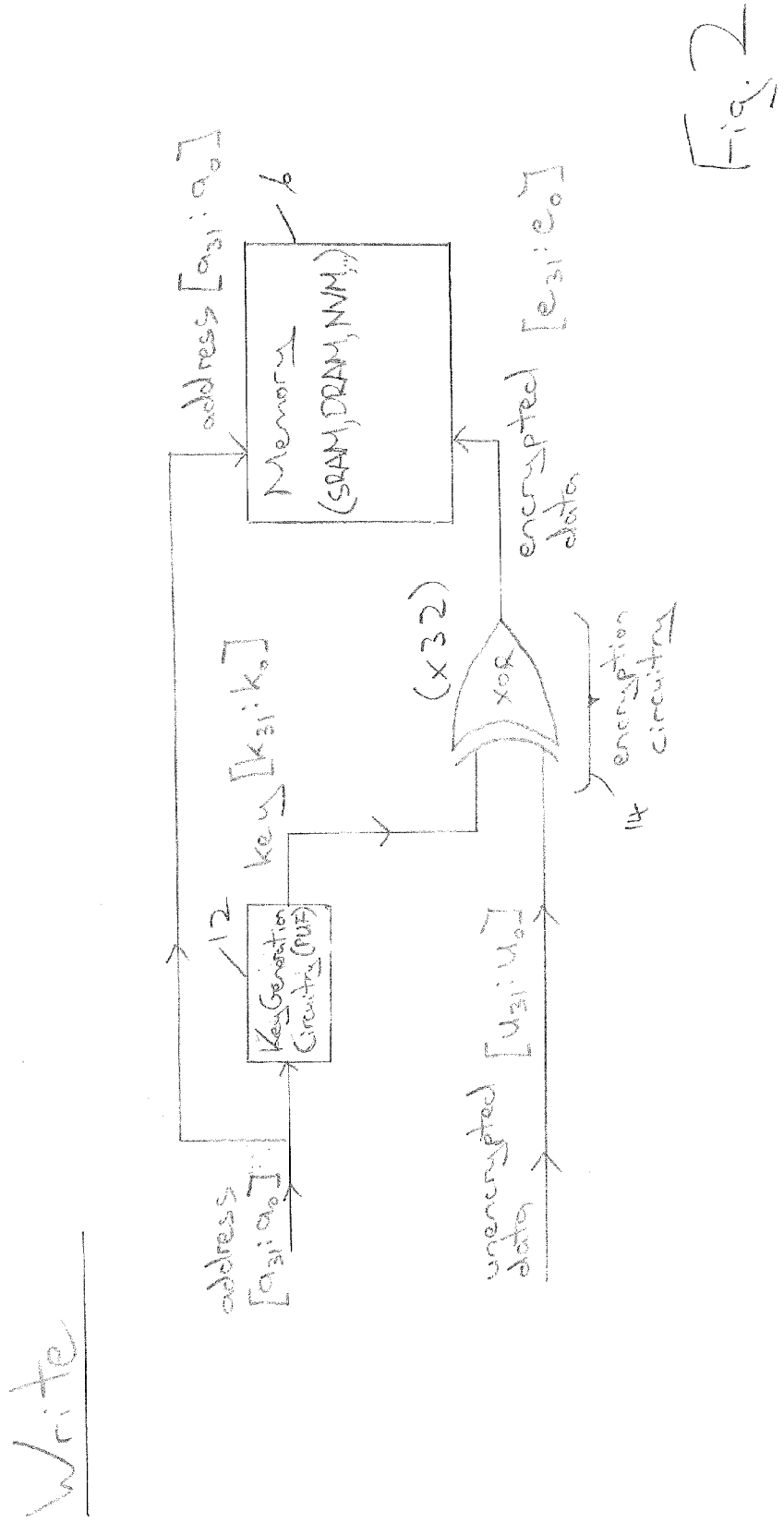
Figure 3:
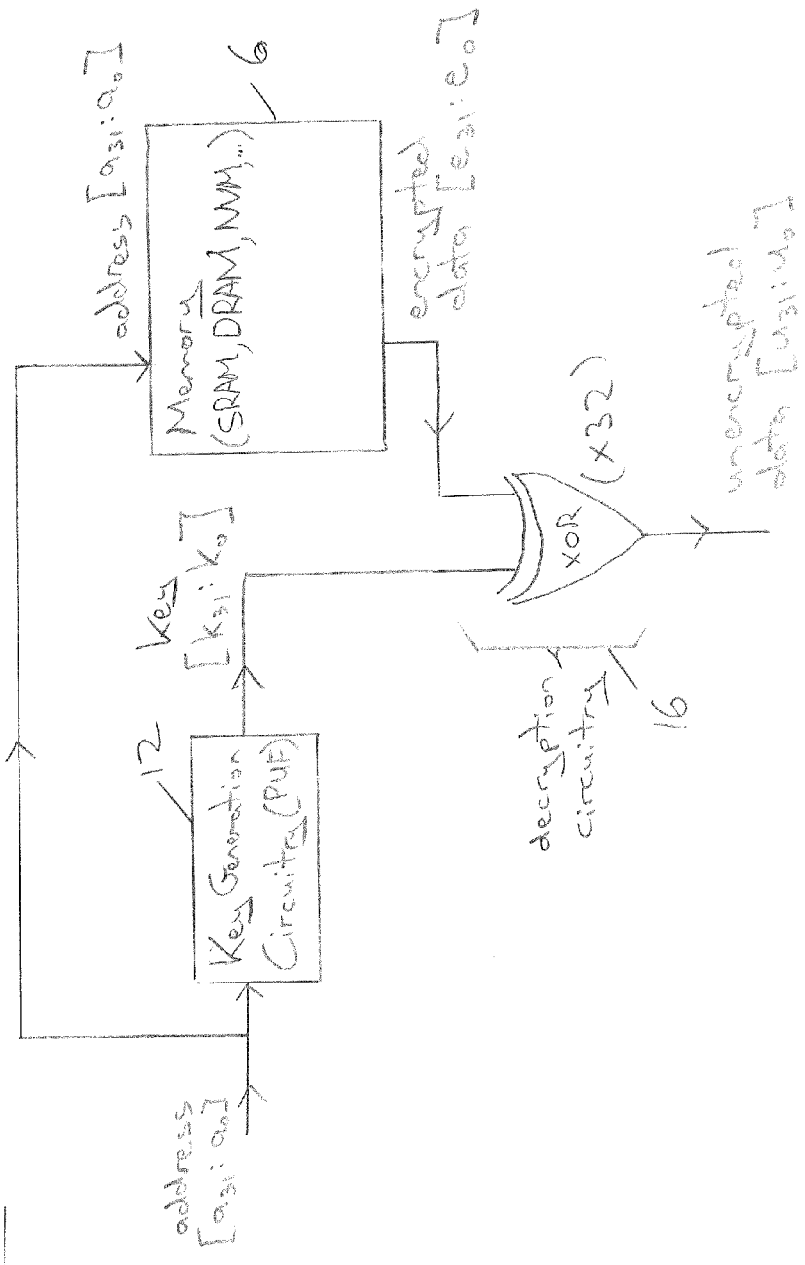
Figure 4:
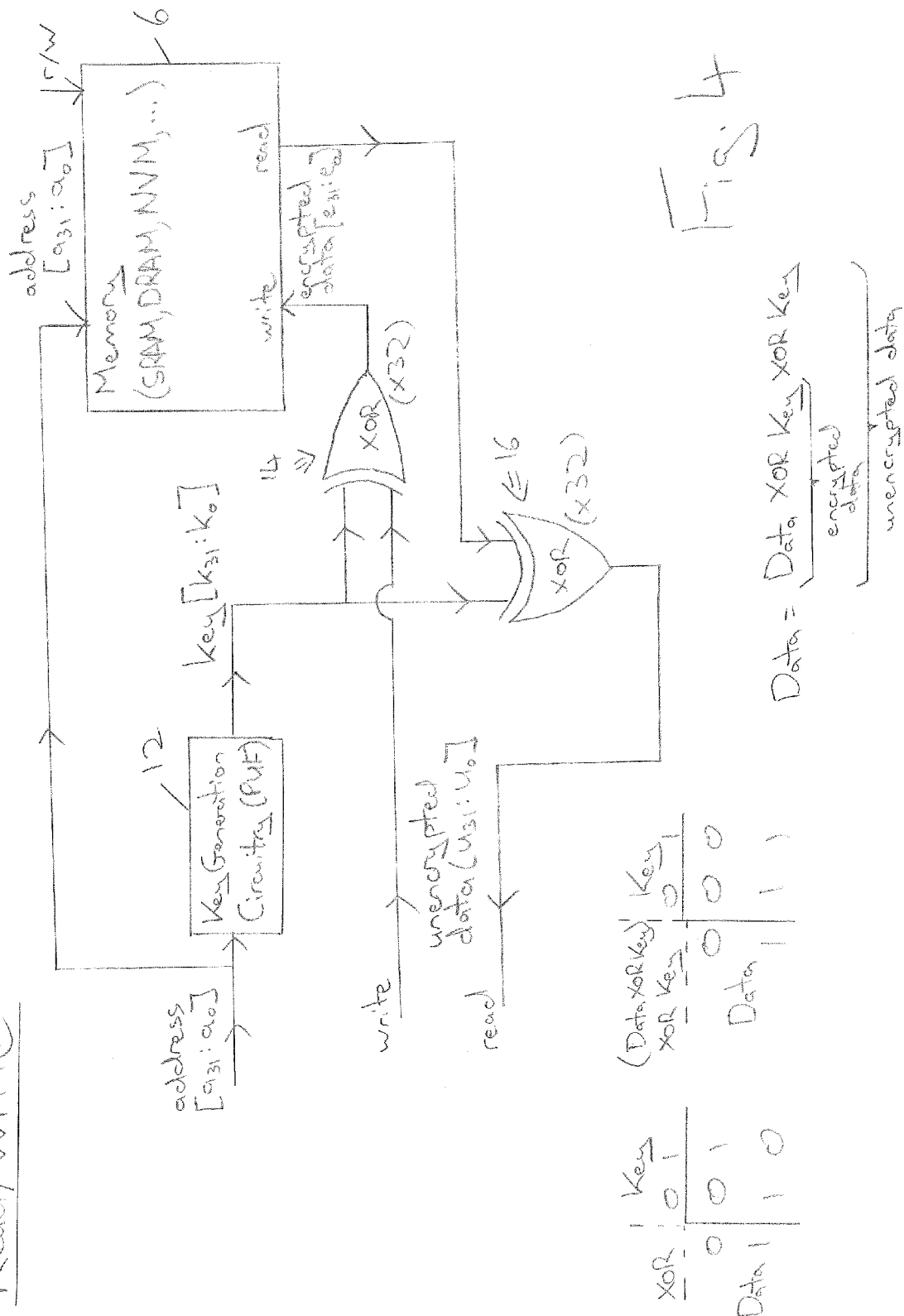
Figure 5:
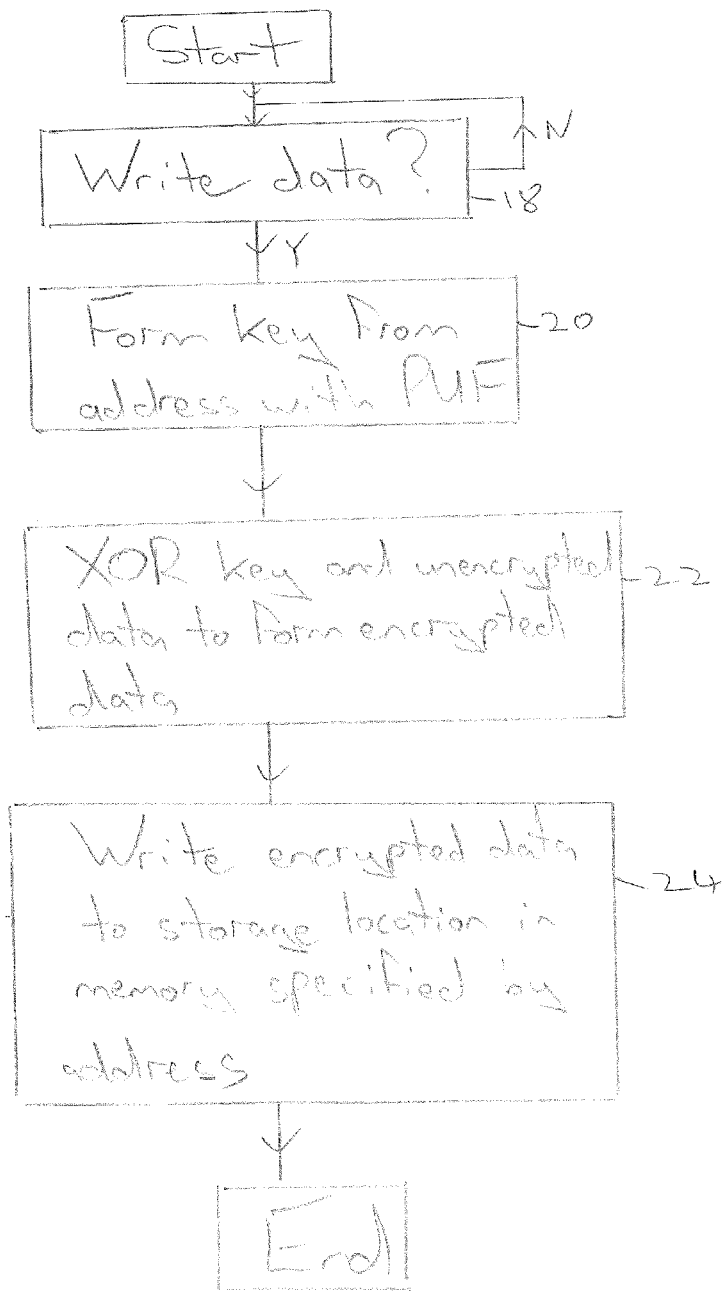
Figure 6:
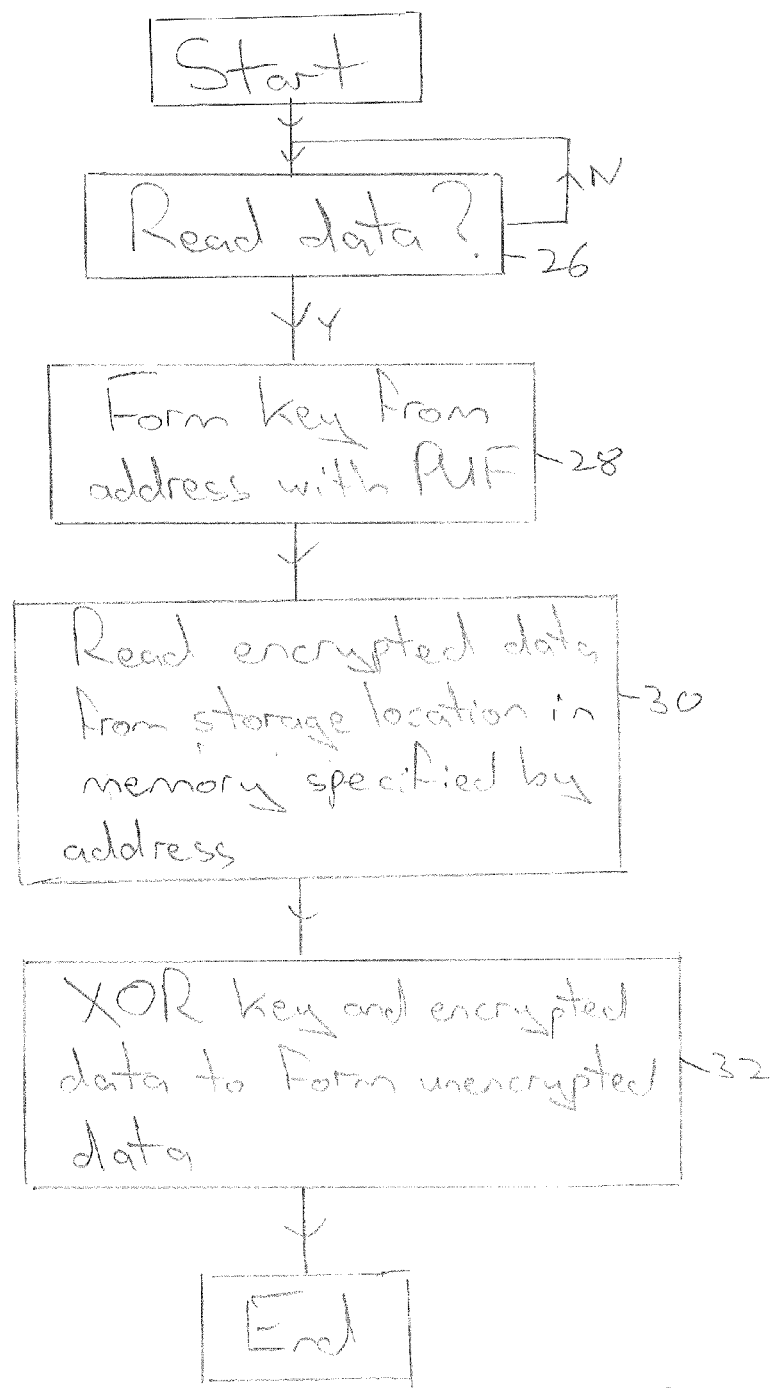

FIG. 1 schematically illustrates a data processing system;

FIG. 2 schematically illustrates a mechanism for encrypting unencrypted data upon data write;

FIG. 3 schematically illustrates a mechanism for decrypting encrypted data upon data read;

FIG. 4 schematically illustrates a mechanism for both encrypting and decrypting data;

FIG. 5 is a flow diagram schematically illustrating an encrypting write process; and FIG. 6 is a flow diagram schematically illustrating a decrypting read process.

EXAMPLE EMBODIMENTS

At least example embodiments of the disclosure provide a low energy and secure mechanism for protecting data whereby the same data written to different addresses within a memory will be encrypted with different keys and accordingly highly likely have a different form. This provides resistance against attacks based upon data remnance as it renders it difficult to identify any particular data within the memory as the same data will highly likely be represented in different forms at different storage locations within the memory.

Security is further enhanced when the key generation circuitry comprises physically unclonable function circuitry (PUF circuitry). There are a variety of different possible forms for such physically unclonable function circuitry, as will be known to those in this technical field.

The address may be used as a challenge input to the physically unclonable function circuitry and the key may be a response output from the physically unclonable function circuitry. The variation from instance to instance of the physically unclonable function circuitry has the result that even if multiple different apparatuses are using the same secret data, the variation in the physically unclonable function circuitry between those different apparatuses will mean that the keys used for the same addresses in the different apparatuses will highly likely be different. Accordingly, such embodiments provide for different keys to be used for different addresses within the same device and for different keys to be used for the same addresses within different devices. This helps resist another form of attack whereby the attacker might seek to analyse multiple devices in order to identify common data at the same addresses within different devices.

While it will be appreciated that the encryption circuitry may use the key in a variety of different ways, one particularly secure way in which the encryption circuitry may be configured is so as to perform one-time-pad encryption of the encrypted data using the key. Such one-time-pad encryption in which any form of unencrypted data may be formed from any form of encrypted data by using a suitable key has the advantage that knowledge of the encrypted data will not assist in yielding any information regarding either the key or the unencrypted data.

Security may be improved within at least some embodiments in which the key has a character width greater than or equal to the character width of the unencrypted data. The use of keys which are at least as wide as the unencrypted data they protect permits a higher degree of security. In practice, as the secret data in some circumstances is likely to be relatively short, it may generally be possible to provide a key which is at least as great in character width.

While the above techniques are generally applicable in providing data security, they can be used with particular advantage to protect systems within which the memory has data remnance behaviour whereby data values stored within the memory induce physical changes within the memory which permit reconstruction of data erased from the memory. Examples of such memories include SRAM memory and DRAM memory. A non-volatile memory is an extreme example of a memory which has data remnance as its nature is that it is intended to provide perfect data remnance.

It will be appreciated that different aspects of the present disclosure comprise a mechanism for writing data to a memory in accordance with the present technique and mechanisms for reading data from a memory in accordance with the present techniques. These mechanisms may also be used in combination. Such embodiments may share the key generation circuitry in a manner which ensures that the same key is generated for encryption as for decryption when the same storage location within the memory is being addressed. Such encryption is turned symmetric encryption.

FIG. 1 schematically illustrates a data processing system 2 in the form of a system-on-chip integrated circuit for use in an internet-of-things device. Such data processing systems 2 typically have a limited energy supply and accordingly encryption and decryption mechanisms they use are required to meet strict energy requirements. The data processing system 2 includes a processor core 4 for executing program instructions and performing data accesses to a memory 6 via encryption and decryption circuitry 8. The data processing system 2 communicates with other data processing systems via input/output circuitry 10 and an antenna 12. The memory 6 is a memory exhibiting data remnance behaviour, such as, for example, an SRAM memory, a DRAM memory or a non-volatile memory.

In operation the processor core 4 executes program instructions and manipulates data which are stored within the memory 6. The program instructions and the data stored within the memory 6 are transformed between an unencrypted form used by the processor core 4 and an encrypted form stored within the memory 6 via the encryption and decryption circuitry 8.

FIG. 2 schematically illustrates a mechanism for transforming unencrypted data $[u_{31}:u_0]$ in the form of 32-bit data words into encrypted data $[e_{31}:e_0]$. An address comprising a 32-bit address $[a_{31}:a_0]$ is supplied as an address to an address input of the memory 6 as well as the input to key generation circuitry 12, which had the form of physically unclonable function circuitry. There are a variety of different ways in which such physically unclonable function circuitry may be formed, e.g. a memory which boots to contain data dependent upon minor physical variations within the individual memory cells, data derived based upon the outcome of race conditions which vary with minor physical variations within the paths, and other examples. The key generation circuitry 12 receives the address as a challenge input to the PUF circuitry and generates the key as a response output from the PUF circuitry. The key is a 32-bit key $[k_{31}:k_0]$.

The nature of the physically unclonable function circuitry 12 is such that different instances of this circuit 12 will have different forms such that the same address when applied as a challenge input to these different instances will highly likely generate a different response output. Such device-to-device variation is part of the security afforded by the use of the physically unclonable function circuitry. An individual instance of the physical unclonable function circuitry will repeatedly generate the same response output from the same challenge input such that the key generated for a given address may be the same on both writing the data into the memory 6 and reading the data out of the memory 6. The key can thus be used to support symmetric encryption.

As illustrated in FIG. 2, the key generated by the key generation circuitry 12 is supplied as one input to encryption circuitry 14 which performs a bitwise XOR operation upon the key and the unencrypted data so as to generate the encrypted data. The encryption circuitry may comprise, for example, 32 parallel XOR gates. The encrypted data which is output from the input circuitry 14 is written into the memory 6 at the address specified.

FIG. 3 schematically illustrates a mechanism for reading encrypted data from the memory 6. The address is applied to the same key generation circuitry 12 which was used when writing data into the memory 6, or at least key generation circuitry which will generate the same key value for the same address as the key generation circuitry which was used during the write operation. The address is applied to the memory 6 and serves to read encrypted data from the storage location specified by the address. The encrypted data is supplied as one input together with the key to decryption circuitry 16. The decryption circuitry 16 performs a bitwise XOR operation, which may be implemented by 32 parallel XOR gates. The output from the decryption circuitry is the unencrypted data.

FIG. 4 schematically illustrates an embodiment employing both mechanisms for encrypting data and decrypting data which share the same encryption circuitry 12. The encrypted data is applied upon writing to a write port of the memory 6. The encrypted data is read from a read port of the memory 6 upon a read operation. A signal r/w specifying whether a read or a write operation is being performed is supplied to the memory 6.

As illustrated in FIG. 4, the XOR operation performed in a bitwise fashion by the encryption circuitry 14 is reversed by the XOR operation performed by the decryption circuitry 16.

FIG. 5 is a flow diagram schematically illustrating an encrypting write process. At step 18 processing waits until there is data to write. Step 20 serves to form a key using the physically unclonable function circuitry 12 and the address to which the write data is to be made as the challenge input to the physically unclonable function circuitry 12. The key is the response output from the physically unclonable function circuitry 12. At step 22, the key and the unencrypted data forming the write are subject to a bitwise XOR operation to form the encrypted data. At step 24 the encrypted data is written into the storage location specified by the address which was used to form the key at step 20.

FIG. 6 schematically illustrates a decrypting read process. At step 26 processing waits until there is a data read to perform. At step 28 the key for decrypting the read data is formed from the address specified for the read using the physically unclonable function circuitry 12. At step 30 the encrypted data is read from the storage location in the memory 6 specified by the address for the read. At step 32 the key formed at step 28 and the encrypted data read at step 30 are subject to a bitwise XOR operation to form the unencrypted data, which is then returned to service the data read.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A method of manufacturing a plurality of devices, comprising:
    manufacturing, in each of the devices,
    key generation circuitry to generate a key as a function of an address of a storage location of a memory, and
    encryption circuitry to encrypt unencrypted data to form encrypted data as a function of said key;
    wherein the key generation circuitry comprises physically unclonable function circuitry to receive said address as a challenge input to said physically unclonable function circuitry, and to output said key as a response output from said physically unclonable function circuitry, the method further comprising:
    manufacturing the devices with device-to-device variation of the physically unclonable function circuitry such that the key generation circuitry of a first device is configured to generate a different key to the key generation circuitry of a second device even when the same input data is supplied to the key generation circuitry of the first device and the second device.

2. The method as claimed in claim 1, wherein the manufacturing is such that the encryption circuitry is configured to encrypt a given data value stored at different storage locations is encrypted using keys generated as a function of different respective addresses.

3. The method as claimed in claim 1, wherein the manufacturing is such that said encryption circuitry has a configuration to perform one-time-pad encryption of said unencrypted data using said key.

4. The method as claimed in claim 1, wherein said key has a character width greater than or equal to a character width of said unencrypted data.

5. The method as claimed in claim 1, wherein the manufacturing is such that said encryption circuitry has a configuration to perform a bitwise XOR of said unencrypted data with said key to form said encrypted data.

6. The method as claimed in claim 1, wherein the manufacturing is such that said memory has data remanence behaviour whereby data values stored within said memory induce physical changes within said memory to permit reconstruction of data erased from said memory.

7. The method as claimed in claim 6, wherein said memory is one of:
    an SRAM memory;
    a DRAM memory; and
    a non-volatile memory.

8. A method of manufacturing a plurality of devices, comprising:
    manufacturing, in each of the devices, key generation circuitry to generate a key as a function of an address of a storage location of a memory, and decryption circuitry to decrypt encrypted data to form unencrypted data as a function of said key;
    wherein the key generation circuitry comprises physically unclonable function circuitry to receive said address as a challenge input to said physically unclonable function circuitry, and to output said key as a response output from said physically unclonable function circuitry, the method further comprising:
    manufacturing the devices with device-to-device variation of the physical unclonable function circuitry such that the key generation circuitry of a first device is configured to generate a different key to the key generation circuitry of a second device even when the same input data is supplied to the key generation circuitry of the first device and the second device.

9. The method as claimed in claim 8, wherein the manufacturing is such that the decryption circuitry is configured to decrypt a given data value stored at different storage locations using keys generated as a function of different respective addresses.

10. The method as claimed in claim 8, wherein the manufacturing is such that said decryption circuitry has a configuration to perform one-time-pad decryption of said encrypted data using said key.

11. The method as claimed in claim 8, wherein said key has a character width greater than or equal to a character width of said encrypted data.

12. The method as claimed in claim 8, wherein the manufacturing is such that said decryption circuitry has a configuration to perform a bitwise XOR of said encrypted data with said key to form said unencrypted data.

13. The method as claimed in claim 8, wherein said memory has data remanence behaviour whereby data values stored within said memory induce physical changes within said memory to permit reconstruction of data erased from said memory.

14. The method as claimed in claim 13, wherein said memory is one of:
    an SRAM memory;
    a DRAM memory; and
    a non-volatile memory.

15. The method as claimed in claim 8, wherein each manufactured device includes encryption circuitry to encrypt said unencrypted data to form said encrypted data as a function of said key.

* * * * *